Jan. 30, 1962 W. D. HOUGHTON 3,019,291

TAPE RECORDING SYSTEM

Filed Aug. 23, 1954

INVENTOR.
William D. Houghton
BY
[signature]
ATTORNEY

United States Patent Office 3,019,291
Patented Jan. 30, 1962

3,019,291
TAPE RECORDING SYSTEM
William D. Houghton, Princeton, N.J., assignor to Radio Corporation of America, a corporation of Delaware
Filed Aug. 23, 1954, Ser. No. 451,666
13 Claims. (Cl. 178—6.6)

This invention relates to a system of magnetic recording and in particular to apparatus for overcoming the effects of undesired phase variations incident to the reproduction of electrical signals recorded on one or more portions of a moveable magnetic medium.

Systems have recently been demonstrated for recording wideband frequency signals on a moveable magnetic medium such as a magnetic tape. Monochrome television signals have been recorded by means of a system in which the monochrome information is impressed on one track of a magnetic tape and the audio components corresponding thereto are recorded on a separate track. Synchronizing information may be recorded on a separate track or on the same track as the monochrome picture information. Such a system is described in an article appearing in the March 1954 issue of RCA Review beginning at page 3.

It is especially important in recording television signals to insure that the signals as reproduced from the tape have the same frequency and phase characteristics as the original signals. This is so because the tape recorded signals may later be used to generate a program for broadcast at a later time.

A method exists whereby the velocity of the moveable magnetic medium may be maintained with a high degree of stability by using the phase of recorded sync signals as an index of velocity changes of the tape. This system has been found very useful in overcoming relatively long term velocity variations in the tape. There still remains an area in which even greater improvement may be obtained in eliminating the effects of whatever short term or relatively rapid velocity changes may exist after velocity control systems such as the one mentioned above have been used.

When tape recording of color television signals for ultimate broadcast is desired, the specifications imposed by the Federal Communications Commission for broadcast permit of very small tolerances. It is, therefore, even more important to insure that the color signals, as played back from a magnetic tape, possess the correct frequency and phase characteristics.

Furthermore, when color television signals are to be recorded it may be convenient to record the color representative signals on separate, parallel tracks of the magnetic tape. This requires that there be a number of recording and playback transducers for impressing and recovering the signals respectively. The velocity control system may be used to lock the recorded video signals to standard synchronizing signals. As tape with the color representative signals so recorded is moved past the playback transducers the skew of the tape may introduce "weaving" i.e., a somewhat lateral movement of the tape as it is moved longitudinally. This may make the phase of the color signals recorded in one track differ, after recovery, from the phase of a color signal which was impressed simultaneously therewith on a different track. The color representative signals may then be sampled or used to modulate a plurality of phases of a subcarrier to produce a standard FCC color television signal. It therefore is desirable to compensate for or equalize the phase difference in each of the recovered signals so as to re-establish the proper time relationships.

Even if the playback mechanism is perfect, the recording mechanism may have introduced time variations in the recorded signals which will be reproduced exactly unless apparatus such as that herein disclosed is used.

According to the present invention, a system is disclosed whereby synchronizing signals or components which have been recorded on a tape along with information signals or components are used to control a variable delay network to which the information signals are applied to offset the phase distortions introduced therein.

It is, therefore, an object of the present invention to overcome phase variations in signals introduced in recording and reproducing systems employing a moveable medium.

Still another object of the invention is to provide a system whereby the effects upon signals of irregular tape velocity in magnetic recording systems for television are overcome.

Still another object of the present invention is to overcome the effects upon signals of tape skew when high frequency signals such as television signals are recorded on a plurality of tracks of a magnetic medium.

Other objects of the invention as well as a more complete understanding of the invention will be apparent upon reading of the following specification and inspection of the drawings in which.

Figure 1:
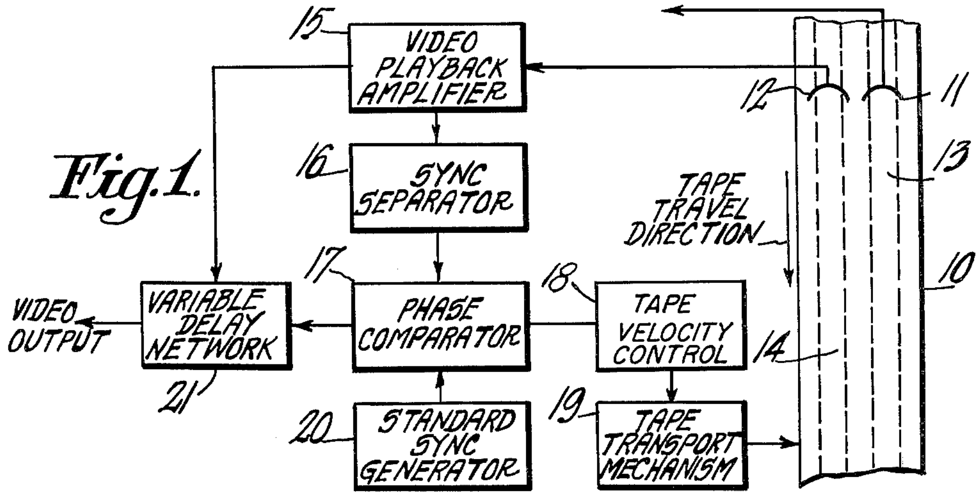
FIGURE 1 is a block and schematic diagram of one form of the present invention.

The present invention will be explained with reference principally to those parts of a tape recording system which involve the impression and recovery of signals such as television signals. Referring to FIGURE 1, a magnetic tape 10 is moved in the direction of the arrow shown, by the action of a tape transport mechanism 19. Mechanism 19 may be conventional and is often a capstan driven by an appropriate motor which presses the tape against an idler wheel (not shown). The tape 10 in FIGURE 1 is shown having two tracks 13 and 14. These tracks contain previously recorded signals. For illustration purposes, we shall assume that track 14 contains a composite monochrome television signal including synchronizing signals. Track 13 is shown merely for background purposes and may contain audio information, for example or, if synchronizing signals are not present in track 14, may contain appropriate synchronizing signals or other timing control signals. Transducer 11 is placed in proximity to track 13 so as to convert the magnetic variations recorded thereupon into corresponding electrical variations.

Transducer 12 is adapted to be substantially in contact with track 14, and converts the magnetically recorded composite video wave into corresponding electrical variations. These variations are amplified and equalized, if necessary, in video playback amplifier 15. The output of playback amplifier 15 is applied to the input of a variable delay network 21. The particular characteristics of the playback amplifier 15 are not important for purposes of this invention. In my copending application Serial No. 362,887, filed June 19, 1953, now abandoned and entitled "Video Signal Recording Systems," an amplifier is shown which is suitable for this purpose, although it is to be understood that any other amplifier possessing sufficient bandwidth may alternatively be employed.

Coupled to the playback amplifier 15 is a sync separator 16 which may be of a type commonly found in commercially available television receivers. A treatment of the general subject may be found in "Basic Television Principles and Servicing" by B. Grob (First Edition 1949, McGraw-Hill) beginning at page 262. Let us assume that the horizontal sync pulses are removed by the sync separator 16. A standard sync or reference signal generator 20 is provided which operates at the horizontal sync rate i.e., 15,750 c.p.s. The phase comparator 17 receives sync pulses, which may have phase variations therein, from separator 16 and highly stable sync pulses from generator 20. If the synchronizing signals have been recorded on track 13, a transducer 11 may be connected directly to an input of phase comparator 17 thereby obviating the need for a sync separator 16. In response to any phase deviation of the recovered sync pulses from the stable sync pulses the phase comparator produces an error voltage which is applied to the variable delay network 21 and to a tape velocity control 18 connected with the tape transport mechanism 19. Phase comparators are well known to those skilled in the television, communications, and allied arts. The AFC circuits of many modern television receivers employ phase comparators extensively. AFC circuits such as "Gen-Lock," "Synchroguide," "Synchrolock" are described in the aforementioned book by B. Grob, page 337, et seq. The tape velocity control 18 may consist of a magnetic clutch which is coupled to the tape transport mechanism 19. Thus, if the velocity of the tape 10 changes, the error voltage works so as to change the speed of the driving motor in the tape transport mechanism 19.

Another part of the error voltage is applied to the variable delay network 21 to which the recovered video wave from amplifier 15 is also applied.

Figure 2:
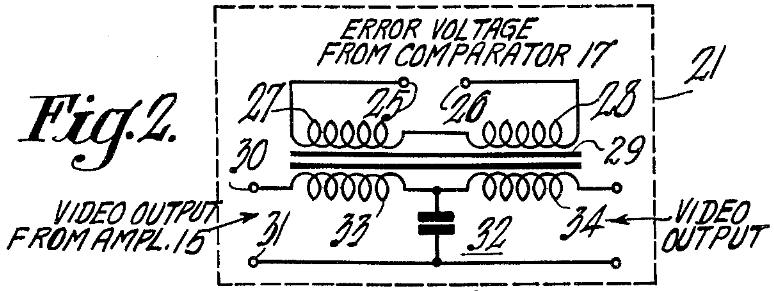
FIGURE 2 is a circuit which may be used to accomplish the variable delay performed in one of the blocks of FIGURE 1.

In FIGURE 2, one such type of variable delay network is shown. The error voltage from phase comparator 17 is applied at terminals 25 and 26. This voltage is a D.C. voltage and is impressed across inductances 27 and 28 as shown. A saturable magnetic core 29 is placed near the inductances 27 and 28 and inductances 33 and 34 and is adapted to have its characteristics change in response to the D.C. component in inductances 27 and 28. The video output wave from amplifier 15 is applied to terminals 30 and 31 of a conventional type of delay line 32. As the D.C. component in inductances 27 and 28 changes, the magnetic state of the core 29 is changed. Therefore, the inductance of the coils 33 and 34 is also changed, and thus the delay of the line 32 is changed accordingly. An analysis of this type of magnetic core and its associated windings may be found in an article entitled "Applications of High Frequency Saturable Reactors," appearing in "Proceedings of the National Electronic Conference, volume 9, February, 1954 beginning at page 299, and in particular at page 304.

It is to be appreciated, however, that any other type of automatically variable delay line may alternatively be used.

Figure 3:
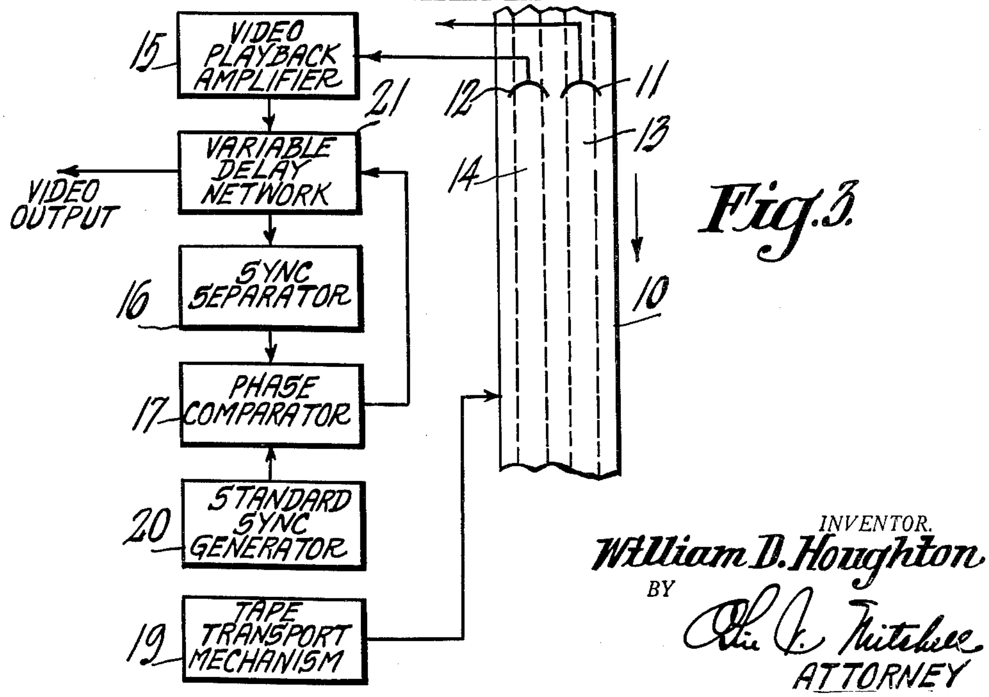
FIGURE 3 is a block and schematic diagram of another form of the present invention.

FIGURE 3 shows another form of the invention and contains elements similar to those in FIGURE 1 which are similarly numbered. Signal information which has been recorded on track 14 of tape 10 is converted into electrical variations by means of transducer 12 which is coupled to video playback amplifier 15. The output of amplifier 15 is applied to variable delay network 21. The delay network 21 has a portion of its output fed to sync separator 16. A phase comparator 17 receives the recovered sync from sync separator 16 and sync from a standard sync generator 20. If the phase of these two sets of sync signals departs from a predetermined relation an error voltage is produced by comparator 17 which is applied to variable delay network 21. As a result, the video signal which is passed through the variable delay network will be delayed as a function of the error signal. The delay network 21 may be the same as the one shown in FIGURE 2 or any other suitable alternative one.

It will be appreciated that for television tape recording the synchronizing signals may be in the form of pulses but a continuous sine wave can perform equally well.

One should also realize that if a number of parallel tracks of information is recorded on a magnetic tape the arrangement shown in FIGURES 1 or 3 may be duplicated for each of the tracks. A system of recording color television signals has been described in which four essentially parallel tracks of a magnetic tape are used on which sync, blue, red, and green voltage waves are respectively impressed. In such a system the apparatus shown in FIGURE 1, for example, could be incorporated with the playback amplifiers for the green, red and blue voltage waves respectively. The sync pulses, recorded on a different track, could be phase compared with standard sync to regulate the amount of delay introduced by the variable delay network 21. In such case the sync separator 16 would not be required. If, in a color television recording system, each of the tracks contains synchronizing information it is obvious that the sync could be separated and compared in phase with standard sync to control an individual variable delay network for each track.

Many other variations and applications are, of course, possible without in any way departing from the principles of this invention.

I claim:

1. In a system for reproducing signals including information components and synchronizing components which have been recorded on a movable medium, apparatus for compensating for phase variations introduced into said signals comprising: means for recovering and delivering said signals from said medium, variable signal delay means coupled to said recovering means for introducing variable delay into signals delivered by said recovering means, and a delay control means coupled to said delay means and said recovering means and responsive to phase variations in reproduced synchronizing components for controlling the amount of delay introduced by said delay means into said recovered signals according to said phase variations in the synchronizing components of said recovered signals.

2. In a recording system, apparatus for overcoming time variations introduced into signals, comprising a moveable medium on which said signals have been recorded, said signals including synchronizing signals and information signals, means for recovering said information signals from said medium, means for recovering synchronizing signals from said medium, means for producing standard synchronizing signals, means coupled to said standard synchronizing signal producing means and to said synchronizing signal recovering means for detecting differences in phase between said recovered synchronizing signals and said standard synchronizing signals, and means coupled to said information signal recovering means for introducing variable delay in said information signals, said variable delay means being controlled in response to said detected phase differences.

3. A system for overcoming time variations which have been introduced into signals including information signals and synchronizing signals which have been recorded on a moveable magnetic medium, said system comprising transducing means for converting said recorded signals into corresponding electrical variations, means for amplifying said electrical variations, means coupled to said amplifying means for separating said synchronizing signals from said information signals, a source of standard synchronizing signals, means coupled to said separating means and to said source of standard synchronizing signals for detecting phase differences between said separated synchronizing signals and said standard synchronizing signals, and a variable delay network coupled to said amplifying means and to said phase difference detecting means for introducing variable delay in said amplified information signals in response to said detected phase differences.

4. A system for overcoming time variations which have been introduced into signals including information signals and synchronizing signals which have been recorded on a moveable magnetic medium, said system comprising transducing means for converting said recorded signals into corresponding electrical variations, means for amplifying said electrical variations, a variable delay network coupled to said amplifying means, means coupled to the output of said variable delay network for separating said synchronizing signals from said information signals, means for generating standard synchronizing signals, and means coupled to said last-named generating means and to said separating means for controlling the amount of delay produced by said variable delay network in response to said separated synchronizing signals and said standard synchronizing signals.

5. A system for the reproduction of television signals which have been recorded on at least one portion of a moveable magnetic medium, said television signals including picture information components and synchronizing information, said system comprising at least one transducer substantially in contact with said portion of said medium for converting said recorded signals into corresponding electrical variations, means coupled to said transducer for amplifying said electrical variations, means coupled to said amplifying means for separating said synchronizing signals, a source of standard synchronizing signals, means coupled to said last-named source and to said separating means for detecting phase differences between said standard synchronizing signals and said separated synchronizing signals, and an electronically variable delay network coupled to said amplifying means and to said phase difference detecting means, said delay network being adapted to delay said amplified electrical variations in response to said detected phase differences.

6. A system for the reproduction of television signals which have been recorded on at least one portion of a moveable magnetic medium, said television signals including picture information components and synchronizing information, said system comprising at least one transducer substantially in contact with said portion of said medium for converting said recorded signals into corresponding electrical variations, means coupled to said transducer for amplifying said electrical variations, a variable delay network coupled to said amplifying means and adapted to receive said amplified variations, means coupled to the output of said variable delay network for separating said synchronizing signals from said electrical variations, a source of standard synchronizing signals, and means coupled to said last-named source and to said separating means for detecting phase differences between said standard synchronizing signals and said separated synchronizing signals, said phase difference detecting means also being coupled to said variable delay network for controlling the delay introduced by said network into said amplified electrical variations in response to said detected phase differences.

7. In a system for reproducing electrical signals from a moving recording medium, said medium bearing recorded representations of an intelligence signal and a periodically recurrent timing signal, said medium being subject to speed variations during reproduction of said signals such that phase irregularities tend to occur in the reproduced signals, the combination of: means operatively associated with said moving medium for reproducing said recorded signals; a variable signal delay means responsive to a phase control signal coupled with said reproducing means for introducing phase changes in signals delivered by said reproducing means as a function of said phase control signal; means operatively coupled with said reproducing means and responsive to said reproduced recurrent timing signal to develop a phase control signal representing phase irregularities in said reproduced timing component; and means operatively coupling said phase control signal to said signal delay means with an electrical sense tending to correct for unwanted phase irregularities in signals delivered by said reproducing means.

8. In a record system making use of a moveable storage medium, said medium having a constant timing control signal and information signals recorded thereon and being subject to variations in the movement thereof, so that timing variations are introduced in said signals, means for supplying a standard reference signal, means for recovering said information signals from said medium, means for recovering said timing control signal from said medium, phase comparator means for deriving voltages from a difference in phase relationship between the recovered timing control signal and the standard signals, and means utilizing said derived voltages for introducing a variable delay in said recovered information signals whereby the effects of said movement variations of said storage medium are substantially eliminated.

9. In apparatus for reproducing recorded signals including a cyclically recurring reference signal recorded at constant frequency, means for maintaining a constant time relationship between the reproduced reference signal and a comparison signal of like frequency to eliminate effects of flutter of the reproducing medium, comprising a delay-line connected to receive the reproduced signals and variable in delay characteristic in response to a control signal, a discriminator connected to receive said comparison signal and signals from said delay-line and to develop an error signal corresponding in sign and magnitude to the difference in time between said reference signal and said comparison signal, and means for applying said error signal as a control signal to vary the delay of said delay-line in such sense as to reduce said time difference.

10. In apparatus for reproducing from a storage medium recorded signals including a reference signal recorded at constant frequency, means for maintaining a constant time relationship between the reproduced reference signal and a comparison signal of like frequency to substantially eliminate timing variations introduced in said signals comprising, means for reproducing said signals from said medium, a delay-line connected to receive from said reproducing means the reproduced signals and variable in delay characteristics in response to a control signal, control means connected to receive said comparison signal and said reproduced reference signal and to develop an error signal corresponding to the difference in time between said reference signal and said comparison signal, and means for applying said error signal as said control signal to said delay-line to vary the delay of said delay-line in such sense as to reduce said time difference.

11. In apparatus for reproducing from a storage medium recorded signals, means for maintaining a constant time relationship between the reproduced recorded signals and a comparison signal comprising, means for reproducing said signals from said medium, a delay-line connected to receive from said reproducing means said reproduced recorded signals and variable in delay characteristic in response to a control signal, control means connected to receive said comparison signal and at least a portion of said recorded signals reproduced by said reproducing means and to develop an error signal corresponding to the difference in time between said portion of said reproduced recorded signals and said comparison signal, and means for applying said error signal as said control signal to said delay-line to vary the delay of said delay-line in such sense as to reduce said time difference.

12. In apparatus for reproducing from a magnetic tape television signals including a cyclically recurring reference signal recorded at constant frequency, means for maintaining a constant time relationship between the reproduced reference signal and a comparison signal of like frequency comprising, means for reproducing said television signals from said tape, a delay-line connected to receive from said reproducing means the reproduced signals and electronically variable in delay characteristics in response to a control signal, a discriminator connected to receive said comparison signal, means coupled to the output of said delay-line to separate said reference signal from said reproduced signals, means to apply said reference signal from said separating means to said discriminator, said discriminator being responsive to said comparison signal and said reference signal to develop an error signal corresponding to the difference in time between said reference signal and said comparison signal, and means for applying said error signal as said control signal to vary the delay of said delay-line in such sense as to reduce said time difference.

13. In combination, a movable storage medium upon which signals are recorded, said signals including a reference signal recorded on said medium at constant frequency, means for reproducing said signals from said medium, a control circuit including a source of a comparison signal of said constant frequency operatively coupled to said reproducing means to receive said reference signal, said control circuit being responsive to said reference signal to develop an error signal corresponding to the difference in time between said reference signal and said comparison signal, means connected to receive said reproduced signals from said reproducing means and to impart a delay to said reproduced signals according to a control signal applied thereto, and means for applying said error signal from said control circuit to said delaying means as said control signal in such sense as to reduce said time difference.

References Cited in the file of this patent

UNITED STATES PATENTS

| | | |
|---|---|---|
| 2,694,748 | Johnson | Nov. 16, 1954 |
| 2,695,331 | Johnson | Nov. 23, 1954 |
| 2,755,446 | Gabor | July 17, 1956 |